United States Patent [19]
Garrison et al.

[11] Patent Number: 5,620,302
[45] Date of Patent: Apr. 15, 1997

[54] DYNAMIC CONDENSATE EVACUATOR FOR HIGH EFFICIENCY GAS FURNACES

[75] Inventors: Bobby D. Garrison; William S. Gatley, Jr., both of Cassville, Mo.

[73] Assignee: Fasco Industries, Inc., Chesterfield, Mo.

[21] Appl. No.: 522,128

[22] Filed: Aug. 31, 1995

[51] Int. Cl.$^6$ ............................................. F01D 25/32
[52] U.S. Cl. ............................................. 415/169.2
[58] Field of Search ........................... 415/169.1, 169.2, 415/201

[56] References Cited

U.S. PATENT DOCUMENTS

| | | | |
|---|---|---|---|
| 3,274,757 | 9/1966 | Wapler | 415/169.2 |
| 3,915,596 | 10/1975 | Frazar | 415/143 |
| 4,603,680 | 8/1986 | Dempsey et al. | 126/99 A |
| 4,649,653 | 3/1987 | Ameling | 415/169.2 |
| 4,856,550 | 8/1989 | Smelcer | 126/99 R |
| 4,899,726 | 2/1990 | Waterman | 126/99 R |
| 5,341,795 | 8/1994 | Chou et al. | 415/169.2 X |

*Primary Examiner*—Edward K. Look
*Assistant Examiner*—Michael S. Lee
*Attorney, Agent, or Firm*—Lorusso & Loud

[57] ABSTRACT

This invention features a condensate drain that drains condensate from an impeller housing as well as an impeller housing having such a drain. This condensate drain is configured so as to allow the condensate from the exhaust to be continuously drained from the housing while the impeller is or is not operating. Preferably, the impeller housing includes a housing shell having an aperture in fluid communication with the housing interior. A top portion of the aperture extends above an interior surface of the housing shell to minimize the venturi effect of air flowing by the aperture responsive to rotation of the impeller. The interior surface of the housing further includes a dished region proximate the aperture, where the bottom of the dished region is arranged to correspond with a bottom edge of the aperture. The cross-sectional area of the aperture portion below the housing shell interior surface has a cross-sectional area that is in the range of from about 10% to about 50% the cross-sectional area of the aperture and more preferably is about 50% of the aperture cross-sectional area. The impeller also includes a hollow member, where the hollow member and housing are formed as an integral structure using a plastic material.

20 Claims, 4 Drawing Sheets

DYNAMIC CONDENSATE EVACUATOR FOR HIGH EFFICIENCY GAS FURNACES

FIELD OF THE INVENTION

This invention relates to condensate drains on draft inducers for furnaces and more particularly to condensate drains for blower housings of high efficiency (e.g. 90%) efficiency heating furnaces.

BACKGROUND OF THE INVENTION

The furnace industry, in its efforts to maximize utilization of fuel resources, have developed furnaces that have a thermal efficiency on the order of 90% and better. As the efficiency of the furnaces is increased there is a corresponding increase in the amount of liquid or moisture entrained in the exhaust gas which condenses out of the exhaust gas stream. Thus, the more efficient the furnace becomes, the more condensate is created. The amount of condensate being created is also dependent upon the relative humidity of the air being used for combustion.

The condensate in the exhaust, particularly in the housing of the draft inducer, is removed because it can cause performance and/or furnace operational concerns. For example, accumulating condensate in the housing can lead to a reduction in the air performance of the air blower which can cause the furnace to shutdown. Also since the condensate from exhaust gases is acidic there are furnace material selection concerns.

To deal with accumulating condensate, the housing of a furnace draft inducer has been provided with a drain connection to drain away the condensate accumulating within the housing. This drain connection, however, has been found to allow drainage of the condensate only when the blower of the draft inducer is in the de-energized condition. When the blower is energized (i.e., in operation), the suctional force developed by the venturi effect of the air flowing across the drain connection opening was sufficient to discourage or prevent the liquid condensate from exiting the condensate drain tube. Essentially, the suctional force at the drain opening establishes a negative pressure at the exit of the drain tube. In addition, although the centrifugal force of the rotating air stream tends to impinge the condensate against the housing scroll shell, the velocity of the air tries to swirl the liquid condensate past the drain opening that is typically flush with the shell surface. Thus because of the swirling fluid and the negative air pressure, drainage of the condensate from the housing was difficult to accomplish when the blower was in operation.

The inability of the condensate to be drained through the drain connection while the blower was running caused the furnace to shutdown the combustion process particularly with furnaces or units that created more than the usual amounts of condensate (e.g., high relative humidity). The furnace would shutdown because, as noted above, the buildup of condensate in the housing during the running mode reduced air performance of the blower. This reduction in performance was interpreted by the furnace's protective circuitry and logic to be a blocked flue condition.

For a blocked flue condition, the furnace draft inducer or blower is kept running to clear or eliminate the blocked flue. Since the blower is kept running, the condensate accumulating in the housing does not drain and thus the furnace remains in the shutdown condition (i.e., furnace cannot refire) because the reduction in performance conditions are still present. Typically, a service person had to be dispatched to diagnosis the problem and resolve it so the furnace could be restarted.

There is, therefore, a need for a means to drain the condensate from the exhaust of a furnace that is accumulating in the housing of an operating impeller and more particularly for draining condensate when using combustion air having a wide range of relative humidity.

SUMMARY OF THE INVENTION

It is, therefore, an object of the present invention to provide a connection for a furnace blower housing that allows accumulated condensate to be drained while the blower is in operation.

It is another object of the present invention to provide a means for draining the condensate from a high efficiency furnace during all furnace operating modes.

It is a further object of the present invention to avoid the need for expensive pipes to try and keep condensate from running down flue pipes into the blower housing.

It is yet another object of the present invention to provide a drain connection for a furnace blower housing that does not create a negative pressure at the drain pipe exit when the blower is in operation.

It is yet a further object of the present invention to provide a housing and drain connection that is economical and easy to manufacture.

Preferably, the impeller housing includes a housing shell having an aperture in fluid communication with the housing interior, where the bottom portion of the aperture extends below an interior surface of the housing shell to minimize the venturi effect of air flowing by the aperture responsive to rotation of the impeller in the impeller housing. The interior surface of the housing shell further includes a dished region proximate the aperture, where the bottom of said dished region is arranged to correspond with a bottom edge of the aperture below the housing shell interior surface. The cross-sectional area of the aperture portion below said housing shell interior has a cross-sectional area that is in the range of from about 10% to about 50% and is preferably about 50% of the cross-sectional area of the aperture. The impeller housing also includes a hollow member, where the hollow member and housing are formed as an integral structure using a plastic material.

The size and design of the aperture is also optimized such that it minimizes the suction action of the venturi effect while maintaining a flow area adequate for draining condensate being condensed out of the furnace exhaust gases. Preferably, the hollow member corresponds to the size and shape of the aperture. More particularly, the aperture is a circular cross-section and the hollow member is a hollow cylindrical or tubular member having the same diameter as the circular aperture.

This drainable impeller housing allows the condensate being created from the exhaust gases to be continuously drained from the housing while the impeller is or is not operating. The drainable housing is also capable of draining condensate when using air having a wide range of relative humidity for the combustion process.

Alternatively, the invention features a condensate drain having a connecting member that is attached to the impeller housing and which has a through aperture that is in fluid communication with the housing interior. The size and design of the aperture is also optimized such that it minimizes the suction action of the venturi effect while maintaining a flow area adequate for draining condensate being condensed out of the furnace exhaust gases.

The connecting member, the drain tube and the impeller housing are arranged so a low point of the drain tube inner surface is disposed below a low point of an inner surface of the impeller housing. Thus, gravity causes the condensate within the housing to flow from the housing inner surface through the aperture downward to the drain tube inner surface. In particular, the arrangement of these components is such that the low point of the tube inner surface is about ½ diameter below the low point of the housing inner surface and in a more particular embodiment, the tube inner surface low point is disposed in the range of from about ¼ diameter to about ½ diameter below the housing inner surface low point.

DESCRIPTION OF THE PREFERRED EMBODIMENT

Figure 1:
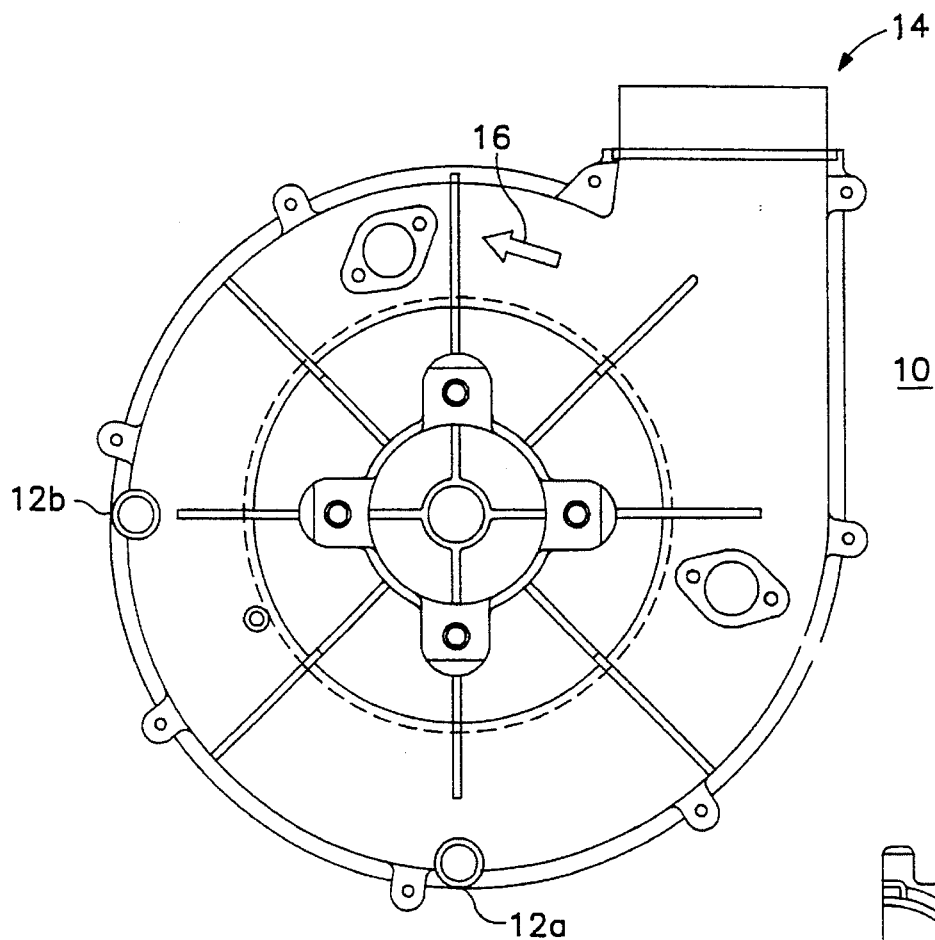
FIG. 1 is a an exterior view of a draft inducer housing having drain connections according to the instant invention.

A high efficiency furnace typically includes a combustion air inlet, a combustion chamber, a heat recovery section, a draft inducer and a combustion gas exhaust. When the furnace is in operation, the draft inducer or combustion blower creates a negative pressure or induces a draft in the furnace so air for combustion is drawn into the air inlet and then into the combustion chamber, where the air is mixed with a fuel such as natural gas for combustion or burning (i.e. the heat energy source). The heat energy of the combustion process is then extracted from the combustion or exhaust gases in the heat recovery section which also results in a reduction in the temperature of the combustion gases. For high efficiency furnaces heat recovery is generally accomplished in two stages.

After passing through the heat recovery section of the furnace, the relatively cooler combustion gases are drawn into the draft inducer or combustion blower by the rotation of the impeller or rotating blades within the draft inducer. The rotation of the impeller or rotating blades of the blower creates the draft which draws the air for combustion into the furnace and which draws the combustion gases through the furnace and the heat recovery sections. The combustion gases are then exhausted by the draft inducer through an exhaust pipe out to the atmosphere.

Because of the high efficiency of these units and the temperature of the combustion gases, some of the moisture entrained in the combustion gas condenses out to form a condensate that accumulates in the draft inducer and flue pipe. As such, and as shown in FIGS. 1–2, the housing 10 of the draft inducer includes at least one drain connection 12a,b to drain off the condensate from the combustion gases.

Although the housing 10 is shown as having two drain connections 12a,b, one of these connections is typically capped or blocked off and the other connection is used to drain off the condensate 22 (FIG. 3). In one orientation, as shown in FIG. 1, the draft inducer is located in a furnace so the exhaust from the draft inducer exhaust 14 or inducer exhaust outlet is vertically upward. For this configuration one drain connection 12a is at the housing's low point, and is used to drain off the condensate 22 from the housing 10. The other connection 12b, which is not at the low point, is capped off (not shown). Alternatively, as shown in FIG. 2, the daft inducer is orientated so the inducer exhaust 14 is parallel to the furnace mounting surface (not shown). In this orientation, one drain connection 12b is at the housing's low point and is used to drain off the condensate 22. The other connection 12a, which is not at the low point, is capped off (not shown).

Figure 2:
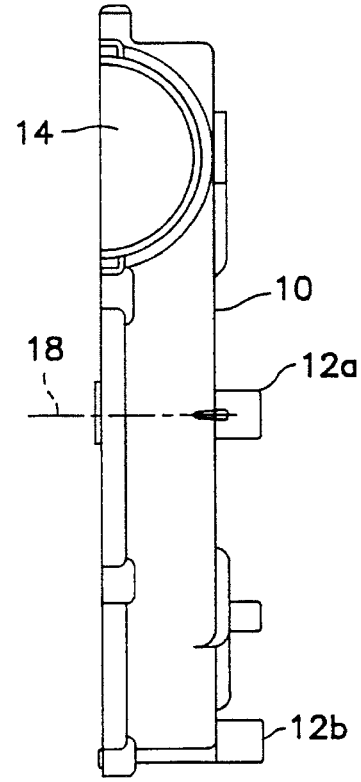
FIG. 2 is a side view of the housing half of FIG. 1.

The orientations of the inducer exhaust housing 14 and of the drains connections 12a,b shown in FIGS. 1–2 are intended to be illustrative of how the drain connections 12a,b and the inducer exhaust 14 are arranged to minimize the accumulation of condensate within the housing 10. As such, the inducer exhaust 14 may be positioned at any of a number of angular orientations and it is within the scope of the present invention for one or more drain connections to be optimally located (i.e., at or about the housing low point) within the housing 10 for draining condensate being accumulated during operation of the draft inducer or furnace blower. Further, the housing 10 may be provided with one or more drain connections on both sides or each half of the draft inducer housing at or about the low point.

As shown in FIG. 2, the drain connections 12a,b each project horizontally outward from the housing 10. In this way, each of the drain connections 12a,b are generally parallel to the furnace mounting surface (not shown) for example the floor on which the furnace rests. Typically piping or tubing (not shown) is connected to an open drain connection 12b (i.e., the drain which is not capped off) so the condensate is discharged safely. For example, the open drain connection 12a could be piped into the drainage piping for the building in which the furnace is located.

Figure 3A:
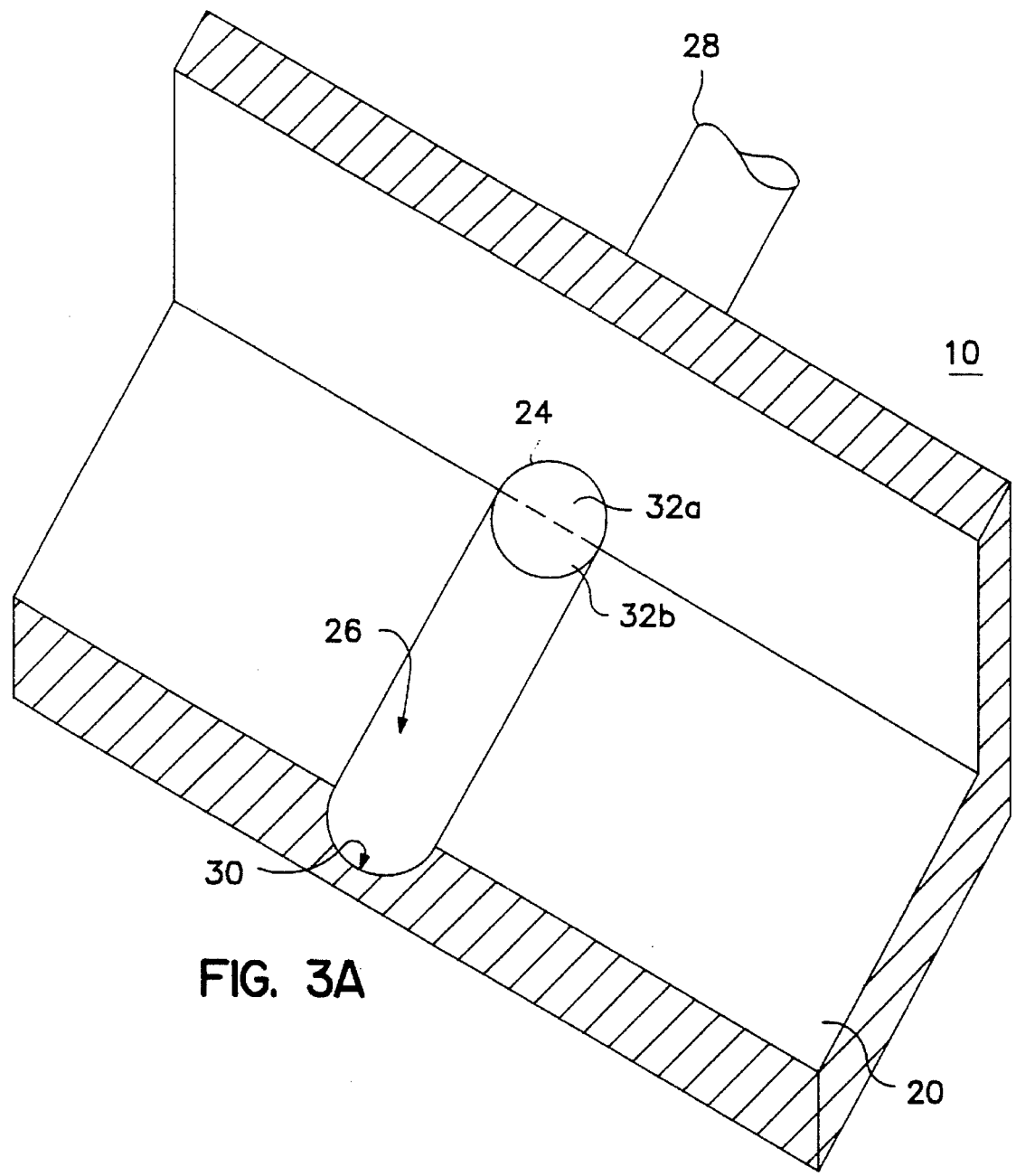
FIG. 3A is a perspective view of a part of the housing interior having a drain connection according to the instant invention.
Figure 3B:
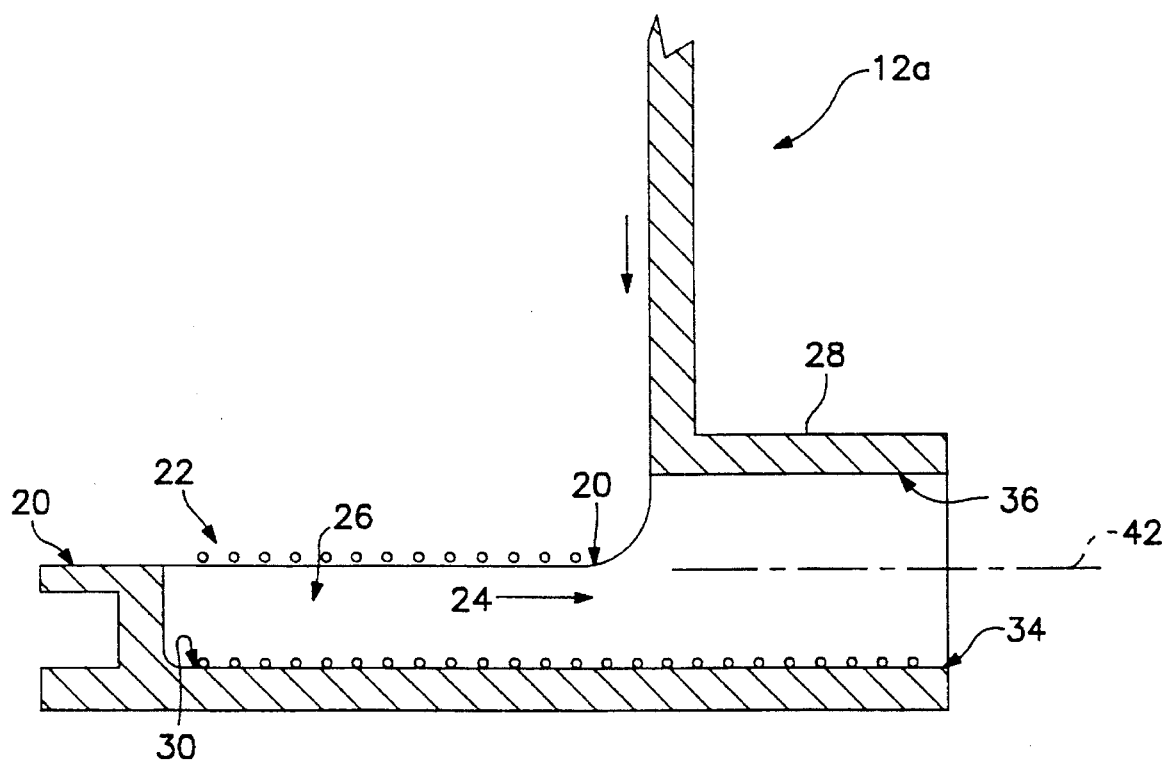
FIG. 3B is a cross-sectional elevation view of a drain connection of FIG. 3A.

There is shown in FIG. 3A a perspective view of a part of the interior of the housing 10, that part of the housing interior about one of the drain connections 12a (FIG. 1) according to the instant invention. A corresponding cross-sectional elevation view of the drain connection 12a is shown in FIG. 3B. As the impeller of the draft inducer rotates in direction 16 (FIG. 1), moisture in the combustion gases condenses out and generally impinges on the inside arcuate surface 20 of the housing 10 that is parallel to the axis 18 of rotation (FIG. 2). This condensate 22 flows downward along the inside arcuate surface 20 responsive to gravity to the low point of the housing 10 whereat at least one drain connection 12a is located.

In a preferred embodiment, the drain connection 12a includes an aperture or a through opening 24 in the housing 10, a dished region 26 in the inside arcuate surface 20 proximate the through opening 24, and a hollow member 28. Preferably, the through opening 24 and dished region 26 are arranged so a portion, a top portion 32a, of the through opening 24 extends above and another portion, a bottom portion 32b, extends below the inside arcuate surface 20 of the housing 10 and as well as so the bottom 30 of the dished region 26 is disposed below the inside arcuate surface. In this way, when the condensate 22 flows to the low point of the housing 10, the condensate flows into the dished region 26, out the through opening 24 and through the hollow member 28 to the discharge means (not shown). The discharge means typically includes tubing or piping interconnected to the hollow member 28 so the condensate 22 can flow from the furnace location to the discharge point (e.g., house drains).

As provided above, when the draft inducer or the draft inducer impeller is in operation, the venturi action caused by the rotating impeller creates a suction action in the drain connection 12a thereby establishing a vacuum in the drain connection. Thus, initially as the moisture entrained in the exhaust gases condenses out, the condensate 22 flows downward and collects in the dished region 26 and the dished region 26 begins to fill with condensate. As the dished region 26 fills with condensate 22, the cross-sectional area of the open portion of the through opening 24 is reduced. This reduction in cross sectional area of the open portion of the through opening 24 causes a reduction in the venturi action of the air flowing by the through opening by the rotation of the draft inducer impeller. Simply, the portion of the dished region 26 filled with condensate 22 is not subject to the suction effect of the rotating impeller.

The condensate 22 continues to collect in the dished region 26 until the cross sectional area of the open portion of the through opening 24 is reduced to the point that the vacuum condition in the drain connection 12a is broken. Thereafter, condensate 22 flowing into and accumulating in the dished region 26 flows out the through opening and into the hollow member 28 for drainage. When the impeller is not in operation, condensate 22 flows downward into the dished region 26 and out the through opening 24 until condensate no longer flows.

As provided above, the through opening 24 is arranged so the top portion 32a is above the inside arcuate surface 20 and the bottom portion 32b is below this surface 20. The top and bottom portions 32a,b are sized and arranged with the dished region 26 so the vacuum condition in the drain connection 12a is broken at least when the level of the condensate 22 accumulating in the dished region 26 reaches the inside arcuate surface 20. More particularly, the vacuum condition is broken before the level of condensate reaches the inside arcuate surface 20. In preferred embodiments, the cross-sectional area of the bottom portion 32a is in the range of from about 10% to about 50% of the cross-sectional area of the through opening 24 and more particularly the bottom portion cross-sectional area is about 50% of the through opening cross sectional area.

In addition to being sized and arranged to reduce or minimize the suction action of the venturi effect when the draft inducer is energized, the area and cross sectional arrangement or design of the through opening 24 provides an adequate flow area for removal of the condensate 22 (FIG. 3B). That is, the cross-sectional area of the top portion 32a is optimized to minimize the venturi suction action when condensate is in the dished region 26 while the cross-sectional area of at least the bottom portion 32b provides an adequate flow area for removing or draining the condensate 22 from the housing 10.

Preferably, the through opening 24 is a circular opening and in one embodiment, the axis 42 of the circular opening is coincident with the housing inside arcuate surface 20. Alternatively, the bottom edge of the circular through opening is disposed in the range of from about ¼ to about ½ of the diameter of the through opening 24 below the inside arcuate surface 20. While circular cross sections are illustrated in FIG. 3A, this is not a limitation as the through opening 24 may be provided with a cross sectional shape of any geometric configuration that reduces the venturi effect while providing an adequate flow area for the removal of condensate. For example, the cross section of the through opening 24 may be rectangular, hexagonal in shape or it may be a circular cross section for more or less than a full circle (e.g., ¾ of a circle).

Preferably, and as more clearly illustrated in FIG. 3B, the bottom 30 of the dished region 26 is arranged to correspond to the bottom 34 of the inside surface 36 of the hollow member 28. In this way, the condensate 22 flows without impediment to the hollow member 28. Alternatively, the dished region 26 is arranged so its bottom surface 30 slopes towards the through opening 24 to assist or further encourage the flow of condensate 22 to and out of the hollow member 28. While the dished region 26 is shown having a circular shape (FIG. 3A) this is not a limitation, as the dished region may have any geometric shape that complements the shape and size of the through opening 24 for the flow of condensate and for minimizing the venturi effect. Also, while FIG. 3B shows the dished region 26 extending across a half section of the housing 10 this is not a limitation, as both housing half sections may include a dished region 26 that feeds a single through opening in one housing half section or which feeds opposing through openings located in each housing half sections.

Figure 3C:
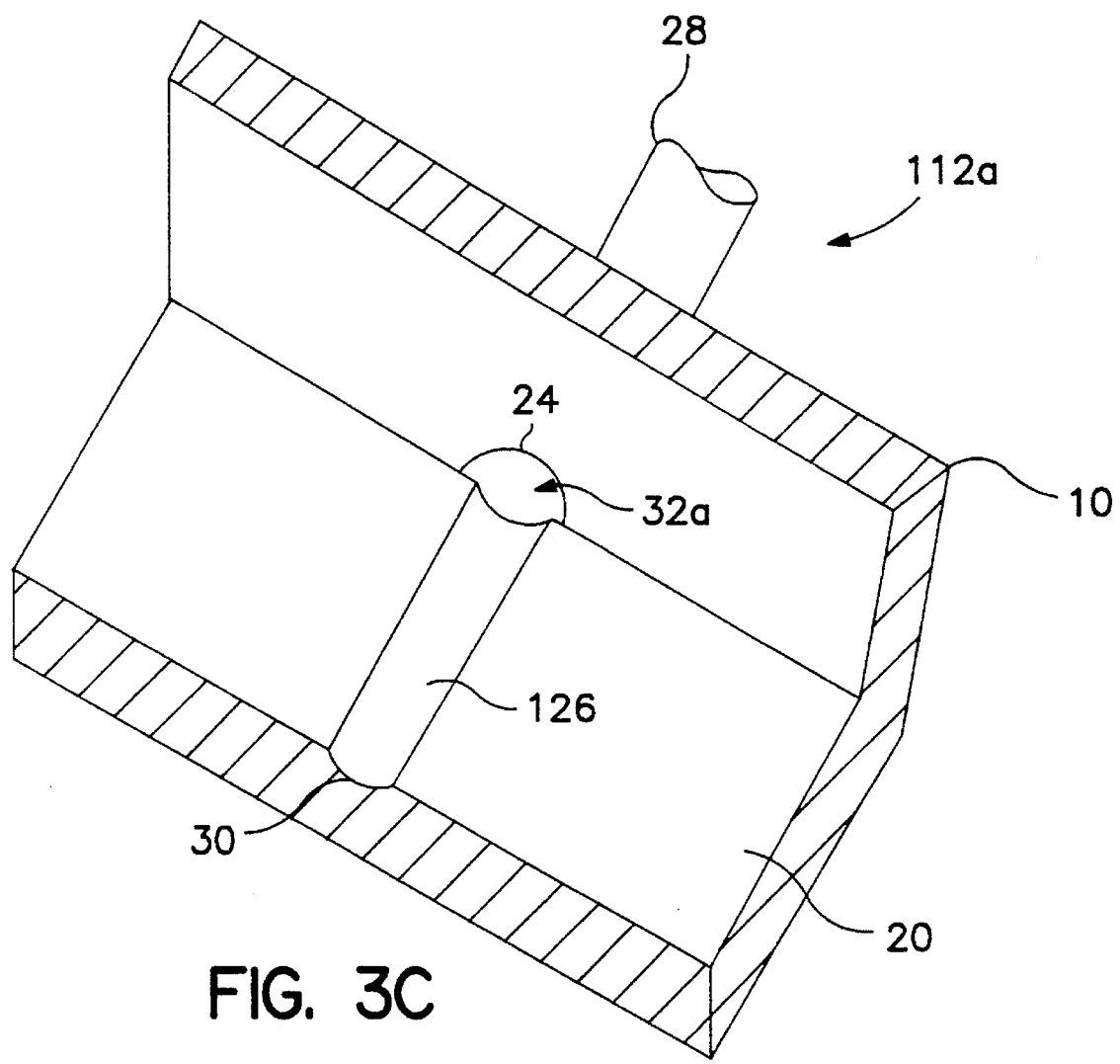
FIG. 3C is a perspective view of a part of the housing interior of an alternate drain connection.

The end of the dished region while illustrated as being generally perpendicular, may be a sloped or hemispherical surface. Alternatively, as shown in FIG. 3C, the dished region 126 is arranged so its bottom surface 30 is below the inside arcuate surface 20 but above the bottom 34 of the hollow member 28. As provided above, the vacuum condition in the drain connection 112a is broken when the level of condensate 2 in the dished region 126 reaches at least the inside arcuate surface 20.

The hollow member 28, preferably is a hollow cylindrical or tubular member, such as tubing, whose inner diameter corresponds to the diameter of the through opening 24. Alternatively, the hollow member may have any geometric shape and size provided the cross-section of the selected shape complements or corresponds to that shape of the through opening 24. The hollow member 28, may include means (e.g., a female connection) for interconnecting the hollow member to the discharge means.

The housing 10, or each housing half, including the drain connection is preferably constructed from a plastic material such as polypropylene or polycarbonate. Alternatively, the housing, housing half and/or drain connection is constructed from any of a number of materials known in the art, such as stainless steel, which can withstand the expected service conditions, for example—the acidity of the condensate and the temperature of the exhaust gases. Also, while the above describes the drain connection as being integrally formed with the housing, the drain connection may be a separate component(s) that is secured to the housing.

In yet another embodiment, the housing 10 or each housing half is provide with an aperture having the desired configuration or shape and size of the through opening 24 and a boss is secured to the exterior of the housing 10 proximate the through hole. The boss includes a female connection for interconnecting the discharge piping to the housing so at least the low point of discharge piping inner surface is below the housing inside arcuate surface 20.

While a preferred embodiment of the invention has been described using specific terms, such description is for illustrative purposes only, and it is to be understood that changes and variations may be made without departing from the spirit or scope of the following claims.

What is claimed is:

1. An impeller housing that drains condensate during all operating modes of an impeller, comprising:

a single-wall housing shell having an interior surface; and at least one aperture in said housing shell through which condensate is drained from said housing; and wherein a portion of said at least one aperture is disposed above the housing shell interior surface so as to minimize the venturi effect of air flowing by said aperture responsive to rotation of the impeller in said housing shell.

2. The impeller housing of claim 1, further comprising a dished region in the housing shell interior surface proximate said aperture.

3. The impeller housing of claim 2, wherein said aperture extends above and below the housing shell interior surface and wherein the bottom of said dished region is arranged to correspond with a bottom edge of said aperture below the housing shell interior surface.

4. The impeller housing of claim 3, where the portion of said aperture below said housing shell interior has a cross-sectional area that is about 50% of the cross-sectional area of said aperture.

5. The impeller housing of claim 3, where the portion of said aperture below said housing shell interior surface has a cross-sectional area that is in the range of about 10% to about 50% of the cross-sectional area of said aperture.

6. The impeller housing of claim 3, wherein said aperture is a circular aperture having a centerline, wherein the centerline is coincident with the housing shell interior surface.

7. The impeller housing of claim 3, wherein said aperture is a circular aperture having a diameter, wherein a bottom edge of said circular aperture is disposed in the range of from about ¼ to ½ of the aperture diameter below the housing shell interior surface.

8. The impeller housing of claim 1, further comprising a hollow member in fluidic communication with said aperture.

9. The impeller housing of claim 8, wherein said hollow member and said housing are formed as an integral structure.

10. The impeller housing of claim 9, wherein said hollow member and said housing are formed using a plastic material as an integral structure.

11. A condensate drain for draining condensate from an interior of a single-wall impeller housing while an impeller is rotating, said condensate drain comprising:

a connecting member being attached to the impeller housing; and wherein said connecting member includes a through aperture that is in fluid communication with the housing interior for draining condensate from the housing, said condensate occluding said aperture, said aperture thereby having a reduced cross-sectional area to minimize the venturi effect of air flowing by said aperture responsive to rotation of an impeller in the impeller housing.

12. The condensate drain of claim 11, further including a hollow drain tube, having an inner surface, that is in fluid communication with said aperture and wherein the reduced cross-sectional area of said aperture is less than the cross-sectional area of said drain tube.

13. The condensate drain of claim 12, wherein said connecting member, said drain tube and the impeller housing are arranged so a low point of the drain tube inner surface is disposed below a low point of an inner surface of the impeller housing, whereby gravity causes the condensate to flow from the housing inner surface through said aperture downward to the drain tube inner surface.

14. The condensate drain of claim 12, wherein the cross-sectional area of the aperture reduced cross-section is about 50% of the cross-sectional area of said drain tube.

15. The condensate drain of claim 13, wherein said connecting member, said drain tube and the housing are arranged so the low point of the tube inner surface is disposed about ½ diameter below the low point of the housing inner surface.

16. The condensate drain of claim 13, wherein said connecting member, said drain tube and the housing are arranged so the low point of the tube inner surface is disposed in the range of from about ¼ diameter to about ½ diameter below the low point of the housing inner surface.

17. The condensate drain of claim 12, wherein said connecting member and said drain tube are formed as an integral structure that is attached to the impeller housing.

18. The condensate drain of claim 11, further including a hollow drain tube, having an inner surface, that is fluid communication with said aperture and wherein a portion of said aperture is disposed below a low point of an inner surface of the housing interior.

19. The condensate drain of claim 18, where the portion of said aperture below the low point includes a cross-sectional area that is about 50% of the cross-sectional area of said aperture.

20. The condensate drain of claim 18, where the portion of said aperture below the low point includes a cross-sectional area that is in the range of about 10% to about 50% of the cross-sectional area of said aperture.

* * * * *